United States Patent [19]

Tollenaere

[11] Patent Number: 5,344,203
[45] Date of Patent: Sep. 6, 1994

[54] AERODYNAMICALLY-STABILIZED COLLAPSIBLE PERSONNEL AND CARGO BASKET FOR HELICOPTERS

[76] Inventor: Donald J. Tollenaere, P.O. Box 1, Bavon, Va. 23013

[21] Appl. No.: 2,829

[22] Filed: Jan. 8, 1993

Related U.S. Application Data

[63] Continuation-in-part of Ser. No. 848,310, Mar. 9, 1992, abandoned.

[51] Int. Cl.⁵ .......................... B65D 6/08; B64D 9/00
[52] U.S. Cl. .................................. 294/68.1; 294/68.3; 244/137.1
[58] Field of Search .................. 294/68.1, 68.2, 68.21, 294/68.3, 77, 66.1; 244/137.1, 137.2, 137.4; 220/4.28

[56] References Cited

U.S. PATENT DOCUMENTS

| | | | |
|---|---|---|---|
| 1,188,185 | 6/1916 | Krulish | 294/77 X |
| 2,503,811 | 4/1950 | Emigholz et al. | 220/4.28 |
| 2,827,325 | 3/1958 | Pugh | 294/68.21 X |
| 2,975,929 | 3/1961 | Ake Sjöblom | 294/68.21 X |
| 2,998,994 | 9/1961 | Karr | 294/68.21 |
| 3,044,818 | 7/1962 | Tobey | 294/81 |
| 3,478,906 | 11/1969 | Smith | 294/68.21 X |
| 3,710,973 | 1/1973 | Franks | 220/4.28 |
| 3,904,156 | 9/1975 | Smith | 244/118 R |
| 4,247,281 | 1/1981 | McGrew et al. | 431/91 |
| 4,378,919 | 4/1983 | Smith | 244/118.1 |
| 4,564,161 | 1/1986 | Frye | 294/77 X |
| 4,936,615 | 6/1990 | Moore | 294/68.1 |
| 4,993,665 | 2/1991 | Sparling | 244/118.1 |

Primary Examiner—Dean J. Kramer
Attorney, Agent, or Firm—Raymond L. Greene

[57] ABSTRACT

An aerodynamically-stable collapsible basket for carrying a load suspended from a helicopter having a loaded and an unloaded flight mode is provided. The collapsible basket comprises a grated floor, mesh sides and a lifting harness assembly. The floor supports the load and comprises a rectangular bottom frame and a grate having four ends. Each end of the grate connects to a different side of the rectangular bottom frame. Apparatus for aerodynamically stabilizing the basket comprises collapsible side-frame assembly having four rectangular side frames pivotally mounted to different sides of the rectangular bottom frame. Stabilization of the basket results from airflow patterns developed by mesh screen sides attached to the basket and the floor grating. Apparatus for attaching the basket to the helicopter comprises two pairs of hooks, each pair being oppositely attached to the top ends of two oppositely-facing side frames.

7 Claims, 6 Drawing Sheets

AERODYNAMICALLY-STABILIZED COLLAPSIBLE PERSONNEL AND CARGO BASKET FOR HELICOPTERS

The following specification is a continuation-in-part of the applicant's prior co-pending application, having the same title and Ser. No. 848,310, filed Mar. 9, 1992, now abandoned.

FIELD OF THE INVENTION

The present invention relates generally to containers and more specifically to a collapsible basket for carrying a load suspended from a helicopter.

DESCRIPTION OF THE PRIOR ART

Helicopters typically are equipped with an external cargo hook, mounted directly under the center of gravity of the helicopter, for transporting loads which do not fit inside the helicopter. Such external loading provides numerous benefits, including speed by eliminating the need for landing the helicopter during loading and unloading, and convenience by permitting transport of large and cumbersome loads. Additionally, for operations in rough terrain without suitable landing sites, external loading permits delivery and pickup of cargo while the helicopter remains airborne. External loading also allows greater loads to be carried. Present methods used to carry external loads suspended beneath a helicopter include placing the load in a net or otherwise attaching ropes or straps and then attaching the ends of the ropes or the rings on the perimeter of the cargo net to a strap called a lanyard. The helicopter then hovers slowly and carefully over the load while the ground crewmen attach lanyard to the helicopter's cargo hook. The pilot then moves the helicopter slowly upward until the load is in the air. At this point, the load hangs as dictated by the center of gravity of its mass. As the helicopter moves, the load is subjected to wind forces which affect the load according to the load's aerodynamic characteristics.

The wind forces which affect loads suspended from a helicopter create numerous problems during transport. Light loads, such as sheets of plywood, are affected by lifting forces which move the load in an unstable oscillatory fashion. Bulky and asymmetrical loads also develop unstable motion by swinging fore and aft as a result of the lifting forces acting upon them, and the movements become more pronounced as airspeed increases. Such oscillatory motion of both light and heavy loads can cause serious safety problems particularly to both ground crew and operation of the helicopter.

Current devices used to obtain and secure external helicopter loads, such as cargo nets and straps, fail to achieve the desired aerodynamic stability or the elimination of the oscillatory motion. Instead, the prior art attacks the problem of aerodynamic stability by designing elaborate, complex harnessing assemblies near the helicopter rather than redesigning the devices which actually carry the load. For example, the prior art in U.S. Pat. No. 4,378,919 by Smith discloses a frame assembly with upper and lower parts and a spreader bar assembly connected between these two parts. This device provides a more stable harnessing arrangement but fails to accomplish any aerodynamic stability from the load-containing device. As a result, loads must be moved at very low airspeed. In the case of low density loads, such as a few sheets of plywood, even rotor blade downwash can develop erratic movement of the load. Further, these devices are unsuitable for the transport of passengers, particularly large numbers of passengers.

SUMMARY OF THE INVENTION

An object of the present invention is to provide a basket with aerodynamic stability during transport of a load.

Another object of the present invention is to provide a basket which has collapsible side walls for easy access.

A further object of the present invention is to provide a collapsible basket with easily removable sides to facilitate shipping and storing of the basket.

Yet another object of the present invention is to provide various points of attachment for ropes or nets used to secure the load.

The present invention attains the foregoing and additional objects by providing a basket for carrying a load suspended from a helicopter. The basket comprises a means for supporting the load, a means for aerodynamically stabilizing the basket during transport, and a means for attaching the basket to the helicopter. The means for supporting the load comprises a rectangular bottom frame and a floor. Preferably, the floor comprises a grate with four ends, each end connected to a different side of the rectangular bottom frame. The means for aerodynamic stability comprises a collapsible side-frame assembly having four rectangular side frames, each side frame pivotally mounted to a different side of the rectangular bottom frame and being covered with mesh screens. These side frames act in conjunction with floor grating slats to provide stability to the empty basket.

The means for attaching the basket to the helicopter comprises two pairs of hooks, each pair attached along one side of the top end of oppositely-facing side frames. Preferably, the means for attaching further comprises a cable-line spreader, with the cable-line spreader comprising four cables, each attached to a different hook. A spreader frame attaches, at each of its corners, to a different cable, and the cables eventually converge upon a common point to connect to the helicopter.

Accordingly, the collapsible basket provides easy storage during non-use and easy accessibility during loading operations. The specially-designed side and floor structure provide aerodynamic stability over a wide range of flight operations.

BRIEF DESCRIPTION OF THE DRAWINGS

The above and numerous other objects of the invention that may be achieved by the preferred embodiment of the invention will be more readily understood from the following detailed description and the appended drawings wherein.

DETAILED DESCRIPTION OF THE INVENTION

Figure 1:
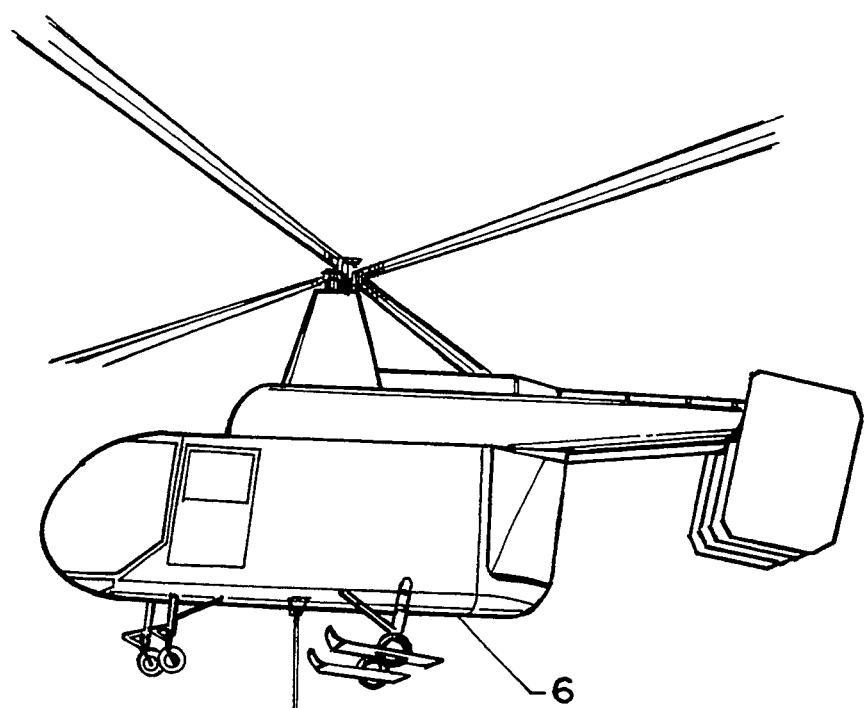
FIG. 1 is a view of a collapsible, personnel and cargo basket of the present invention suspended from a helicopter.
Figure 1:
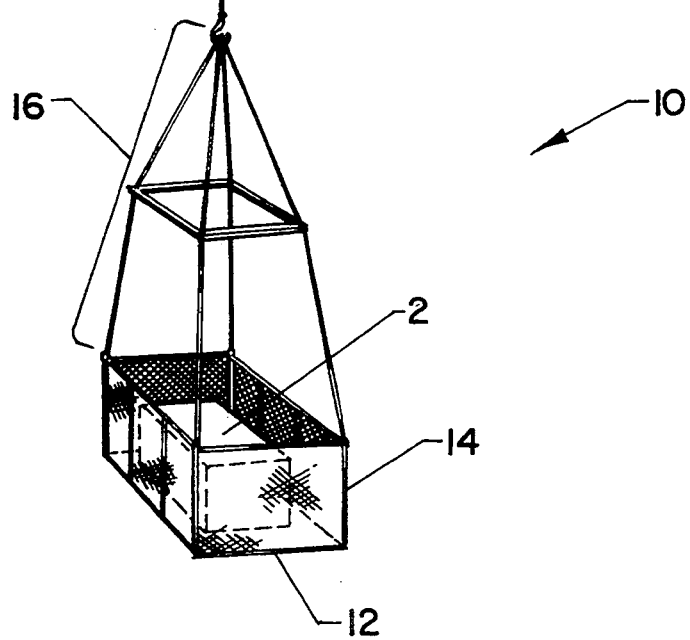

Referring now to FIG. 1, the collapsible, helicopter personnel and cargo basket assembly of the present invention, designated generally as 10, is shown carrying a load 2 suspended from a helicopter 6. The collapsible basket 10 has three major functional subassemblies—a means for supporting the load or base 12, a means for aerodynamically stabilizing the basket or mesh screen assembly 14, and a means for attaching the basket or harness assembly 16.

Figure 2:
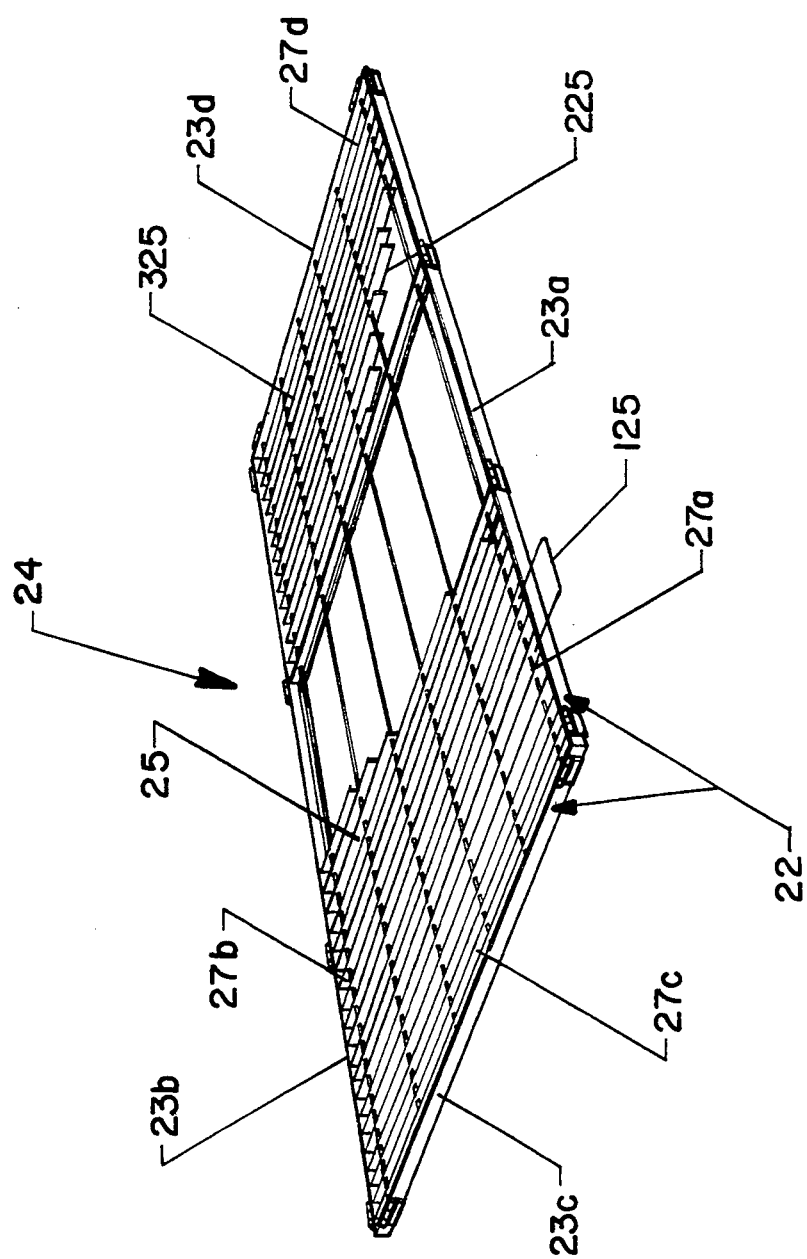
FIG. 2 is a view of a base of the present invention supporting a load.

FIG. 2 shows that the base comprises an elongated rectangular bottom frame 22 and a floor 24. The bottom frame has four sides 23a, 23b, 23c and 23d. In the preferred embodiment, the long sides of the bottom frame, sides 23a and 23b are approximately twice the length of the short sides 23c and 23d. Preferably, the bottom frame 22 is constructed from aluminum angles welded together to afford sturdy yet lightweight construction. The floor 24 comprises a grate 25 having four ends 27a, 27b, 27c and 27d. Each end 27 a-d respectively connects to a different side 23 a-d. The grate 25 is positioned within the frame 22 such that a plurality of slats 125 are aligned in the direction of travel of the helicopter. Each slat is also positioned to be standing on one of its thin sides 225, and the other thin side 325 supports the load. This particular positioning of the slats provides two distinct advantages. First, the spacings within the grate 25 are large enough that a rope or safety net may securely tie-down the load. Additionally, this particular positioning provides beneficial aerodynamic characteristics which will be discussed further in the operation of the invention.

Figure 3:
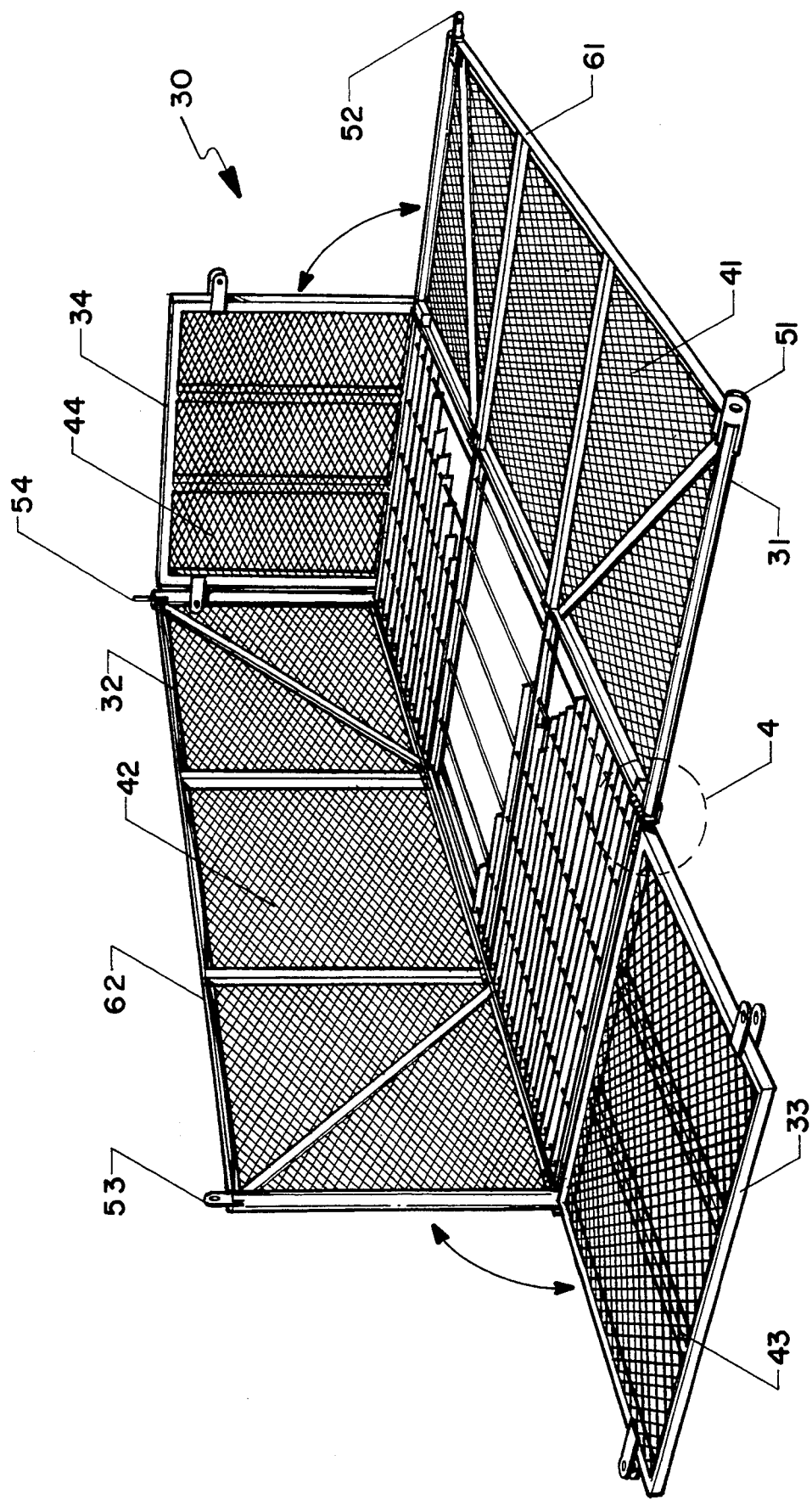
FIG. 3 is a perspective view of a mesh screen assembly of the present invention.

FIG. 3 shows the mesh screen assembly comprising a collapsible side-frame assembly 30 and at least four mesh screens 41, 42, 43 and 44. The collapsible side-frame assembly 30 comprises four rectangular side frames 31, 32, 33, and 34. The side frames 31, 32, 33 and 34 are also made of aluminum to provide sturdy, lightweight construction. Each mesh screen 41, 42, 43 and 44 respectively connects to a different side frame 31, 32, 33 and 34.

The mesh screens 41, 42, 43 and 44 serve two important functions. First, the screens enclose load during transport and thereby provide both security and safety, particularly if the basket is carrying passengers. Less obviously, the mesh screens give aerodynamic stability to the basket, which also will be further discussed in the operation of the invention.

Each side frame 31, 32, 33 and 34 pivotally mounts to a different side, listed in FIG. 2, 23a, 23b, 23c and 23d of the bottom frame, respectively. Dashed circle 4 shows a location of one of the hinges which is shown in more detail in FIGS. 4a and 4b.

Figure 4A:
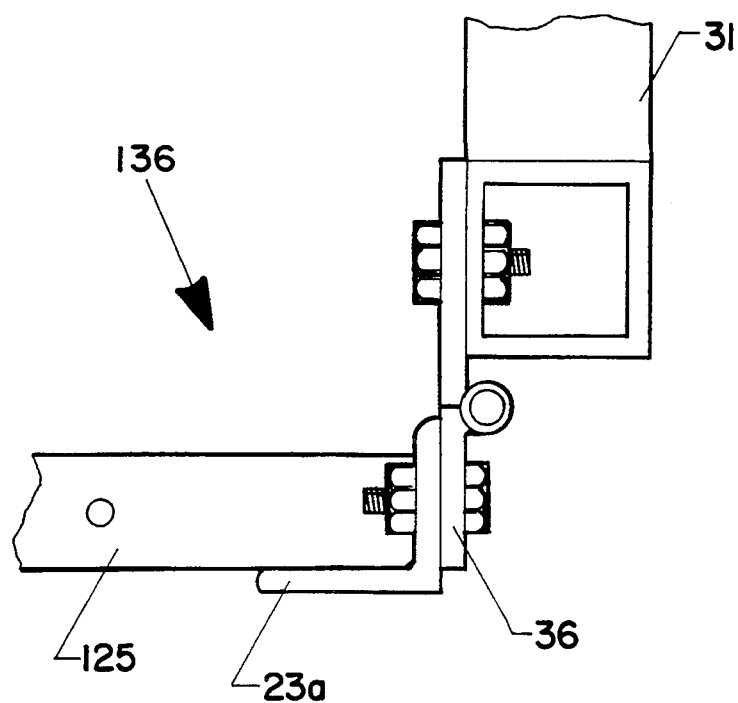
FIG. 4a and 4b are enlarged views of a pivotal mount of the present invention.
Figure 4B:
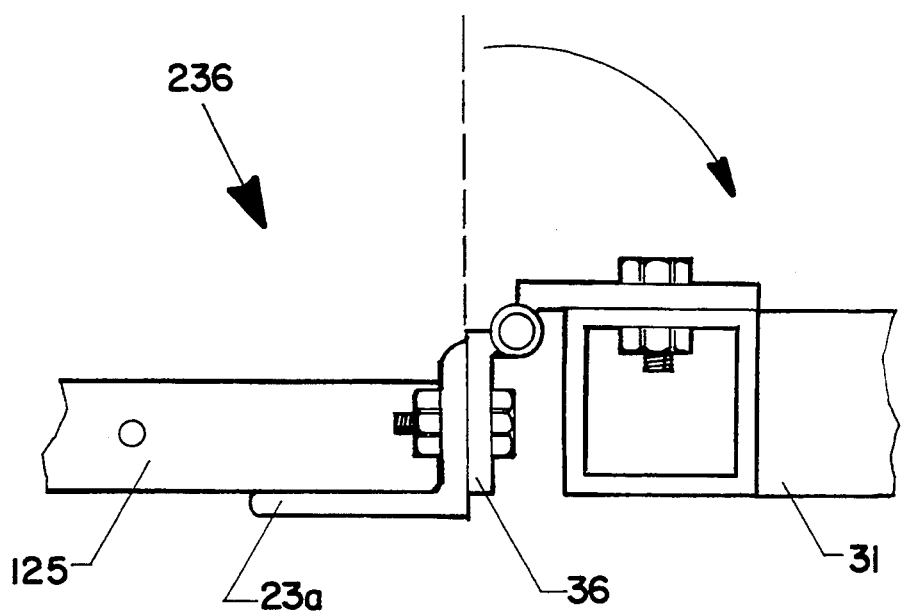

FIGS. 4a and 4b particularly identify one of the pivotal mounts or hinges 36 between the bottom frame and side frame 31. Preferably, the pivotal mount comprises a plurality of hinges 36. Each hinge allows free rotation of the side frames. For example, FIG. 4a shows that hinge 36 permits free rotation of the side frame 31 into an erect position 136 to contain the load when the basket is in use during flight. FIG. 4b further illustrates that hinge 36 also allows the side frame 31 to have a collapsed position 236, thereby providing easy access to the load. The hinge 36 also enables the side frames to lie flat next to the base in a position which allows an all-terrain vehicle to ride over the side frame and approach the load.

Referring back to FIG. 3, the harness assembly includes four hooks 51, 52, 53 and 54. One pair of the hooks 51 and 52 is attached to the top end 61 of one of the four side frames. The other pair of hooks 53 and 54 is accordingly attached to the top end 62 of the side frame opposite the other frame of attachment.

Figure 5:
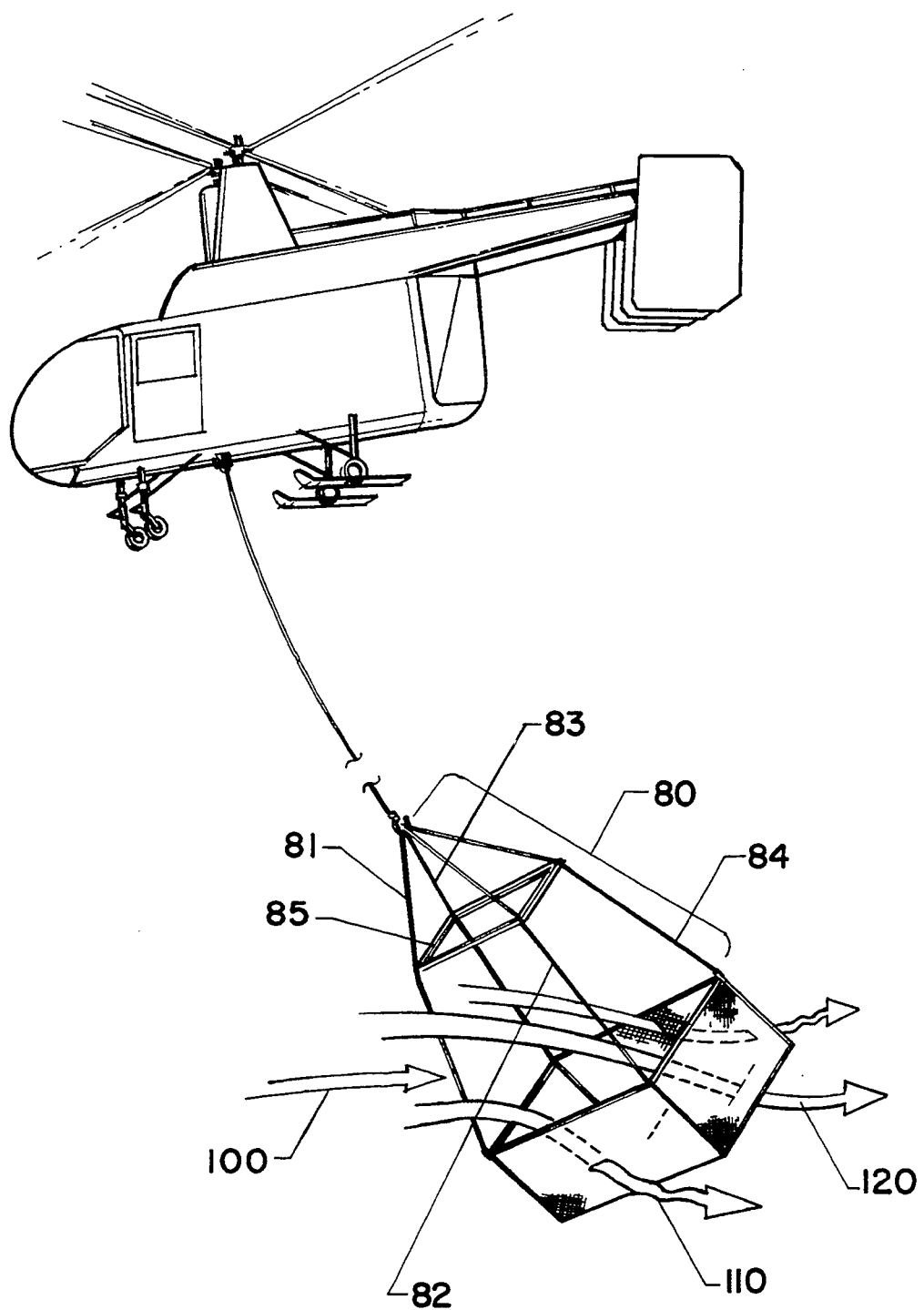
FIG. 5 illustrates a harness assembly and the airflow characteristics of the empty basket during flight.

FIG. 5 illustrates the harness assembly and the basket is towed flight. The harness assembly further comprises a cable-line spreader 80. The cable-line spreader 80 comprises a spreader frame 85 and four cables 81, 82, 83 and 84. Each cable is respectively attached at one end to a different hook eyelet, shown in FIG. 3, 51, 52, 53, and 54. The other ends of the four cables converge together and connect to the helicopter. Each cable 81, 82, 83, and 84 further respectively attaches at a point between the two ends to a different corner of the spreader frame 85.

The cable-line spreader 80 is a commercially available device. As shown in FIG. 5, the spreader 80 reduces twisting and tangling of cables. The spreader 85 also widens the angle of the load placed on the tension points of the basket thereby avoiding excessive compression forces on the basket or on an over-sized load.

OPERATION OF THE INVENTION

Figure 6:
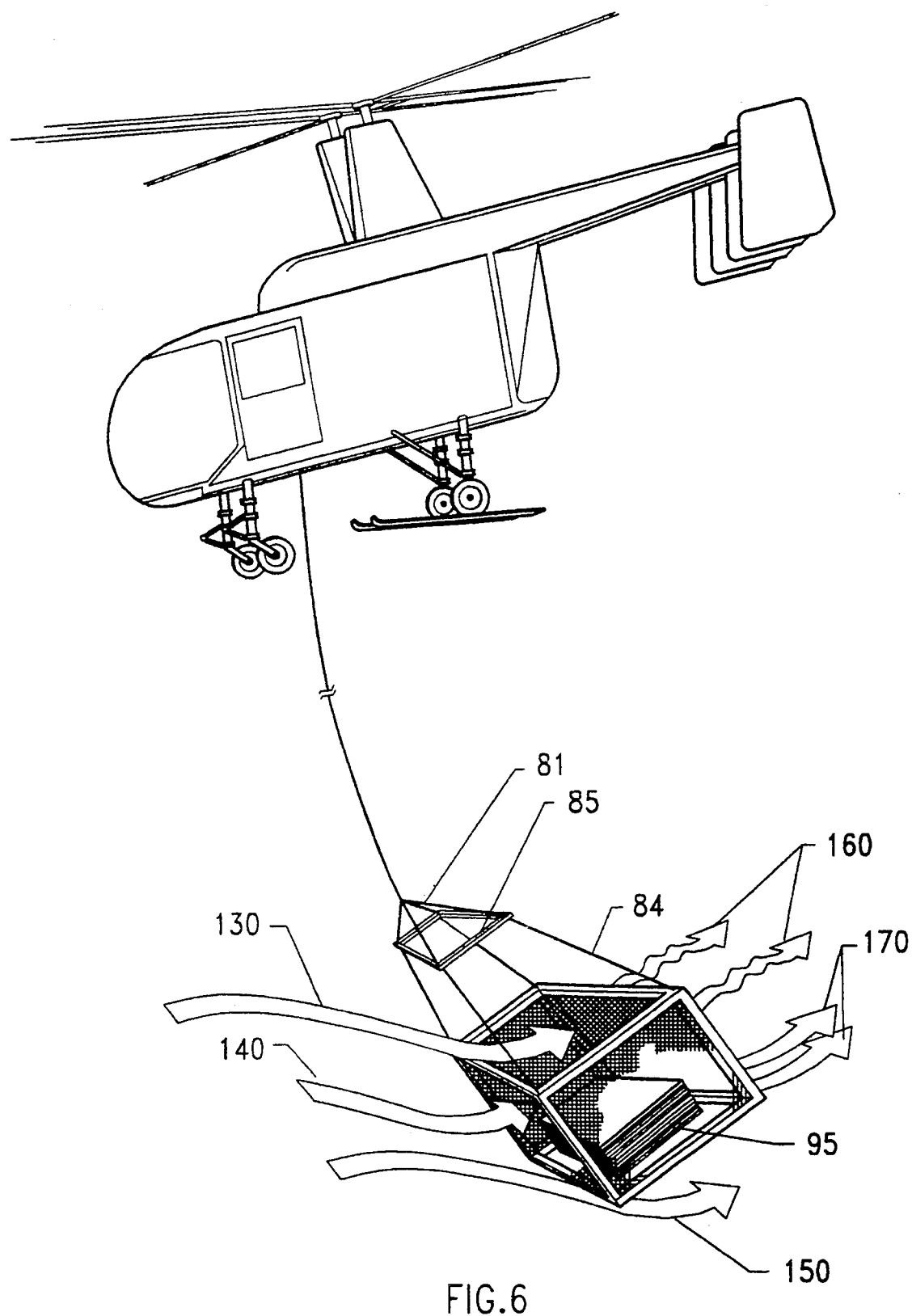
FIG. 6 illustrates the airflow characteristics of the loaded basket during flight.

As shown in FIG. 5, the basket provides stable, non-oscillatory flight by solving the problem of aerodynamic instability. At operating speed, the empty basket is suspended slightly aft of the aircraft and flies with its long dimension aligned with the longitudinal axis of the aircraft. The flight alignment appears to result from the floor slats 125 aligning themselves crosswise to the direction of flight thereby acting as a partially spoiled airfoil. In contrast, a loaded basket flies with its long dimension aligned with the lateral axis of the aircraft as depicted in FIG. 6, the changed flight alignment appearing to result from the entire load acting as a partially spoiled airfoil. Further, a comparison of identical loads carried with or without the basket show that the mesh sides of the basket inhibit oscillatory motion of the basket. For example, without the basket, transport of a stack of twelve 4×8 ft. plywood sheets by strapping the load together and attaching it to the cargo hook results in highly oscillatory flight. The oscillations are sufficient to endanger ground crews and, at higher speeds, destabilize the helicopter. Lift forces develop on the surfaces of the plywood sheets and cause wide lateral swinging and vertical movements of the load. Transport of this same load in a cargo net and even on the floor portion (without sides installed) of the basket herein also did not provide stable flight. Only with the mesh sides attached did the basket exhibit stable flight.

FIG. 6 illustrates how the basket provides aerodynamic stability. Freestream airflow 130 approaches the basket and passes through the mesh screens as shown by the side flow 140 or under the basket as shown by flow 150. The screens divide the airflow 130, and the resulting spillage of sideflow 160 through the screens apparently provides a turbulent or stalled airflow pattern prior to and around the load, thereby reducing the unstable lifting forces ordinarily encountered. With an empty basket, ordinarily the least stable configuration, the slats of floor grating also allow the freestream airflow 100 through the floor. The flow 120 flows through the open floor grates with the slats aligned laterally to the direction of flight, that is, with the long dimension of the basket aligned with the direction of flight. This flight alignment further stabilizes the basket during unloaded flight. The alignment takes place due to aerodynamic forces acting on the basket. When the basket is lifted in hover and low-speed flight, there is no particular alignment and the basket can twist in relation to the helicopter.

Flight demonstrations for the United States Army, Coast Guard and Forest Service have shown both the loaded and unloaded baskets to be stable in the following maneuvers:

| Empty (375 lbs) | |
| --- | --- |
| Straight and level | Airspeed envelope 0–70 Kts. |
| Decelerating 360° turn | Airspeed 60–40 Kts. |
| Quick Stop | Airspeed 70 Kts. to 0 Kts. |
| Out of trim turning approach | 70 Kts. to hover |
| Basket with a 950 lb. Load | |
| Straight and level | Airspeed envelope 0–90 Kts. |
| Decelerating 360° turn | Airspeed 70–40 Kts. |
| Quick Stop | Airspeed 80 Kts.–0 Kts. |
| Out of trim turning approach | 80 Kts.–hover |

The advantages of the present invention are numerous. The basket provides a lightweight, collapsible structure for easy storage and ground transport. The basket floor provides a lightweight and strong loading, carrying, and tie-down surface while providing maximum flow through of air for an empty basket. The side assemblies can be folded down for loading of equipment, such as all-terrain vehicles, which may then be driven into the basket. When the sides are erected for flight, loads other than those secured to the floor may be carried. The basket can carry up to ten firefighting personnel with equipment. In addition, the basket may be used for rescue, including water rescue. Further, with the mesh sides erected the basket allows load shape and weight changes over a wide range without affecting the stability of the load. Most importantly, the dual stability modes, both loaded and empty, provide the capability to deliver a load at normal high speeds and then return to the pick up point with an empty basket, also flying at normal high speeds.

Many variations will be apparent to those skilled in the art. For example, various flotation devices may be added for use of the basket in water operations. Likewise, spring legs can be added for use in rough terrain. It is therefore to be understood that, within the scope of the appended claims, the invention may be practiced other than as specifically described.

What is claimed as new and desired to be secured by Letters Patent of the United States is:

1. An elongated rectangular basket having vertical sides and an elongated bottom frame and floor with a short dimension and a long dimension for carrying a load suspended from a helicopter comprising:
   a. means for supporting the load;
   b. means for aerodynamically stabilizing the basket for both unloaded and loaded configurations during high speed transport comprising aerodynamic slats aligned across the short dimension of the floor, thereby providing an empty flight mode with the basket aligned longwise in the direction of flight and further comprising mesh screen on the vertical sides, thereby providing a second stable flight mode for loaded flight with the basket aligned with the long dimension crosswise to the direction of flight; and
   c. means for attaching the basket to the helicopter.

2. An elongated rectangular basket according to claim 1, wherein the bottom frame is rectangular having the long dimension approximately twice the length of the short dimension.

3. An elongated rectangular basket according to claim 1, wherein said means for aerodynamically stabilizing the basket comprises a collapsible side-frame assembly, said collapsible side-frame assembly comprising four side frames, each side frame pivotally mounted to different sides of a bottom frame.

4. An elongated rectangular basket according to claim 3, wherein each side frame is rectangular.

5. An elongated rectangular basket according to claim 1, wherein said means for attaching the basket to a helicopter comprises two pairs of hooks, each pair being oppositely attached to the top ends of two oppositely-facing side frames of the basket.

6. An elongated rectangular basket according to claim 5, wherein said means for attaching further comprises a harness and spreader assembly.

7. An elongated rectangular basket for carrying a load suspended from a helicopter comprising:
   a. an elongated rectangular bottom frame and a floor having a plurality of slats;
   b. a collapsible side-frame assembly and four mesh screens, said collapsible side-frame assembly comprising four rectangular side frames, each side frame pivotally mounted to different sides of the rectangular bottom frame, each mesh screen connected to a different side frame, thereby providing turbulent and separated airflow ahead and around the load such that two stable flight modes are provided, an empty flight mode with the basket aligned longwise in the direction of flight and a loaded flight mode with the basket aligned crosswise to the direction of flight;
   c. two pairs of hooks for attaching the basket to a suspension harness, each pair being oppositely attached to the top ends of two oppositely-facing side frames; and
   d. a suspension harness having a spreader assembly to separate suspension lines leading to the basket hooks and a ring assembly for attachment to the helicopter lifting point.

* * * * *